(12) United States Patent
Chen

(10) Patent No.: US 6,868,775 B2
(45) Date of Patent: Mar. 22, 2005

(54) BREAD TOASTER WITH MOTOR-DRIVEN TOAST RACK

(75) Inventor: Hua-Jin Chen, Tongfuyu Ind. (CN)

(73) Assignee: Crastal Technology (shenzhen) Co. Ltd., Shenzhen (CN)

( * ) Notice: Subject to any disclaimer, the term of this patent is extended or adjusted under 35 U.S.C. 154(b) by 38 days.

(21) Appl. No.: 10/715,905

(22) Filed: Nov. 17, 2003

(65) Prior Publication Data

US 2004/0221745 A1 Nov. 11, 2004

(30) Foreign Application Priority Data

May 6, 2003 (CN) ........................................ 03225955 U

(51) Int. Cl.[7] .......................... A47J 37/08; A23L 27/62; A23L 1/00
(52) U.S. Cl. .................. 99/327; 99/329 P; 99/329 RT; 99/389; 99/391
(58) Field of Search ........................... 99/326–333, 341, 99/385, 386, 389–391, 392, 393; 219/521, 524, 525, 492, 400, 494, 386

(56) References Cited

U.S. PATENT DOCUMENTS

| | | | | |
|---|---|---|---|---|
| 2,719,479 A | * | 10/1955 | Rodwick | 99/391 |
| 2,800,070 A | * | 7/1957 | Olson et al. | 99/329 R |
| 4,976,195 A | * | 12/1990 | Cavazos | 99/391 |
| 5,018,437 A | * | 5/1991 | San Juan | 99/327 |
| 5,960,702 A | * | 10/1999 | Thiriat et al. | 99/327 |
| 6,112,648 A | * | 9/2000 | Origane | 99/388 |
| 6,298,772 B1 | * | 10/2001 | Nguyen et al. | 99/327 |
| 6,382,084 B2 | * | 5/2002 | Chan et al. | 99/327 |
| 6,431,057 B1 | * | 8/2002 | Leung et al. | 99/326 |
| 6,543,337 B1 | * | 4/2003 | Brown | 99/327 |
| 6,571,687 B1 | * | 6/2003 | Wu et al. | 99/327 |
| 6,595,111 B1 | * | 7/2003 | Chiu et al. | 99/327 |
| 6,667,465 B2 | * | 12/2003 | Garber et al. | 219/413 |

* cited by examiner

Primary Examiner—Timothy F. Simone
(74) Attorney, Agent, or Firm—Raymond Y. Chan; David and Raymond Patent Group

(57) ABSTRACT

A toaster includes a toaster housing having a toaster slot for the bread slice disposing therein, a toasting device for toasting the bread slice in the toaster slot, and a toast racking arrangement including a bread supporting rack movably mounted in the toaster slot, a motor having a driving shaft for producing a rotational force, and a rack driving unit including a driving member having two ends respectively engaged with the driving shaft and the bread supporting rack to drive the bread supporting rack to slidably move along the toaster slot between an upper releasing position and a lower toasting position. At the releasing position, the driving member is driven to lift up the bread supporting rack along the toaster slot, and at the toasting position, the driving member is driven to lower the bread supporting rack for toasting the bread slice.

23 Claims, 13 Drawing Sheets

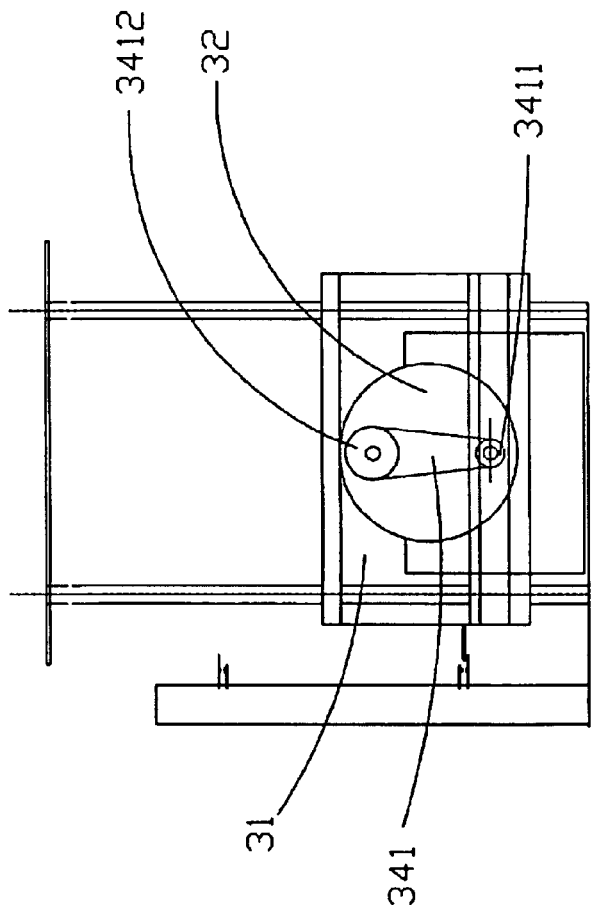
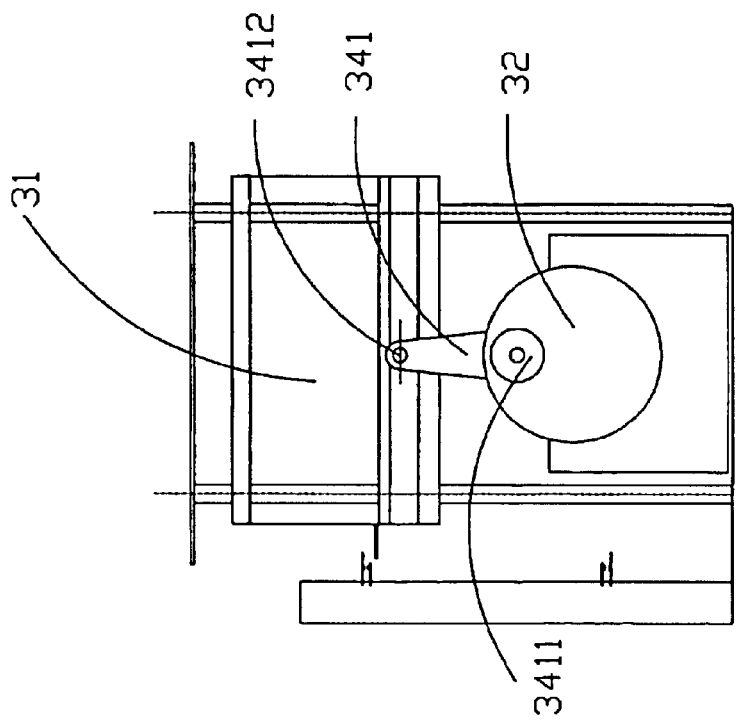
FIG. 4B
FIG. 4A

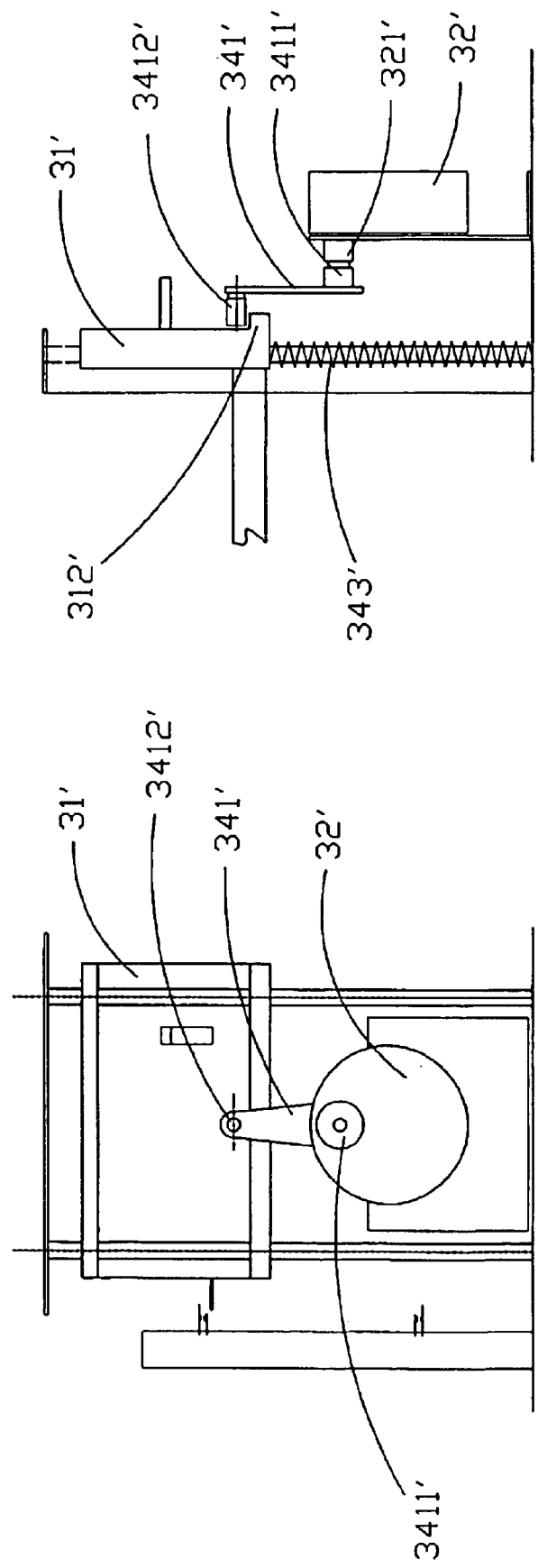

BREAD TOASTER WITH MOTOR-DRIVEN TOAST RACK

BACKGROUND OF THE PRESENT INVENTION

1. Field of Invention

The present invention relates to a toaster, and more particularly to a toaster with a motor-driven rack which is capable of precisely and efficiently lowering a bread slice into the toaster for toasting, and raising the bread slice when the toasting is finished.

2. Description of Related Arts

Toasters have long been developed and widely utilized for making a regular bread slice brown and crisp to become a toast. Such a toast is warmly welcomed by people of all ages and therefore served in a wide variety of restaurants and groceries.

A conventional toaster comprises an toaster case having a toaster slot for receiving a bread slice therein, a toasting device disposed in the toaster case for toasting the bread slice in the toaster slot, and a rack frame which is adapted to support the bread slice therein for toasting, and is movably supported in the toaster slot in such a manner that it is capable of moving between a lower toasting position and an upper operative position, wherein in the lower toasting position, the toasting rack is lowered to activate the toasting device for toasting the bread slice in the toasting rack, wherein in the upper operative position, the toasting rack is raised for manual retrieval of the toasted bread slice.

The conventional toaster further comprises means for raising the toasting rack from the lower toasting position to the upper operative position. The raising means usually comprises a resilient element, such as a compressive spring, mounted in the toaster case and arranged to normally apply an upward urging force to the toasting rack in such a manner that when toasting of the bread slice in the toasting position is finished, the resilient element is arranged to apply an upwards force to the toasting rack for raising it from the lower toasting position back to the upper operative position.

Despite its popularity, it is obvious that such a conventional toaster has several discrepancies. First of all, the resilient element is only designed for a particular bread's slice size and shape, or at best for a limited range of bread slice's sizes and shapes. That means the conventional toaster is not suitable for all kinds of bread slice, even though their sizes can be fitted into the toaster slot. As a result, when the force provided by resilient element is too small, the bread slice, when toasted, will still stay in the toaster slot so that a user cannot take the toast out from the toaster (under-ejecting). At worst, the bread slice may be burnt and cause fire. When the force is too large, the toast may be ejected into the air (over-ejecting) from the toaster and get dirty when falling onto the ground. As result, the bread slice is wasted and the user needs to take some time to make another one. But the most anomalous thing is that the second bread slice usually comes from the same batch as the first slice, therefore, the second bread slice risks the scenario as that of the first slice.

Second, when the resilient element has too large a stiffness, not every user of the toaster can be able to depress the toasting rack to the lower toasting position in order to toast. In this context, it is kind of dangerous especially for a child who wants to do the toasting by himself/herself.

Of course, precise raising and lowering of the toasting rack can be accomplished by electrical and electronic methods. However, this inevitably increase the manufacturing and the ultimate selling price of the toasters. As toasters have become a very popular kind of domestic small appliances, generally speaking, their price are affordable by most of the families, and as a result, the above-discrepancies of the conventional toasters should not be overcome at the expense of increase in manufacturing and selling price thereof. Otherwise, public interest would actually be jeopardized by inventing something new and expensive, yet it is supposed to be an affordable and convenient product.

SUMMARY OF THE PRESENT INVENTION

A main object of the present invention is to provide a toaster with a motor-driven rack which comprises a bread supporting rack for supporting a bread slice thereon, wherein the vertical movement of the bread supporting rack is substantially driven by a rotational force of a motor so as to lift up and lower the bread slice in a stable manner.

Another object of the present invention is to provide a toaster with a motor-driven rack which is adapted for toasting a wide variety of bread slices without having the problems of under-ejecting or over-ejecting as in the case of above-mentioned conventional toasters.

Another object of the present invention is to provide a toaster with a motor-driven rack which does not require manual depressing thereof in order to toast. In other words, a user of the present invention does not need to worry about any difficulty in depressing the rack.

Another object of the present invention is to provide a toaster with a motor-driven rack which does not involve any complicated or expensive mechanical or electrical components, so that the manufacturing cost as well as the ultimate selling price of the present invention can be minimized. In other words, the present invention can be effectively kept affordable.

In order to accomplish the above objects, the present invention provides a toaster for toasting a bread slice, comprising:

a toaster housing having a toaster slot for the bread slice disposing therein;

a toasting device provided in the toaster housing for toasting the bread slice in the toaster slot; and a toast racking arrangement, comprising:

a bread supporting rack movably mounted in the toaster slot for supporting the bread slice;

a motor having a driving shaft rotatably extended thereof for producing a rotational force; and a rack driving unit comprising a driving member having a motor driving end engaged with the driving shaft of the motor and a rack driving end movably coupled with the bread supporting rack in such a manner that when the driving shaft is driven to rotate, the driving member drives the bread supporting rack to slidably move along the toaster slot between an upper releasing position and a lower toasting position, wherein at the releasing position, the driving member is driven by the motor to lift up the bread supporting rack along the toaster slot, and at the toasting position, the driving member is driven to lower the bread supporting rack for toasting the bread slice by the toasting device within the toaster slot.

These and other objectives, features, and advantages of the present invention will become apparent from the following detailed description, the accompanying drawings, and the appended claims.

BRIEF DESCRIPTION OF THE DRAWINGS

FIG. 4A and 4B are schematic diagrams of the toast racking arrangement according to the above first preferred embodiment of the present invention, wherein FIG. 4A illustrates that the bread supporting rack is in the upper releasing position, and FIG. 4B illustrates that the bread supporting rack is in the lower toasting position.

FIG. 7A and FIG. 7B are respectively sectional front view and sectional side view of the toaster according to a second preferred embodiment of the present invention.

DETAILED DESCRIPTION OF THE PREFERRED EMBODIMENT

Figure 1:
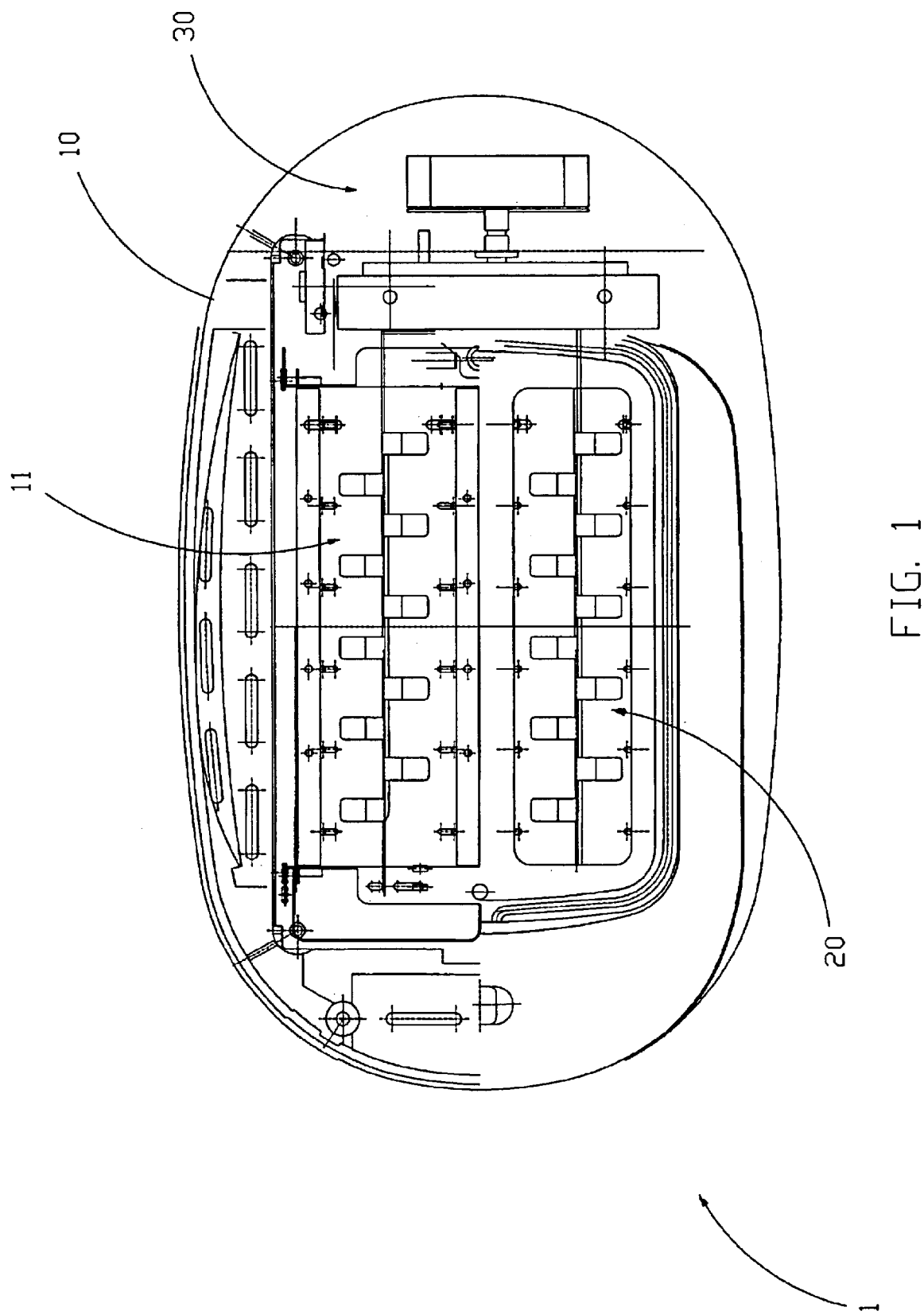
FIG. 1 is a perspective view of a toaster according to a first preferred embodiment of the present invention.

Referring to FIG. 1 of the drawings, a toaster 1 for toasting a bread slice according to a first preferred embodiment of the present invention is illustrated, in which the toaster 1 comprises a toaster housing 10, a toasting device 20, and a toast racking arrangement 30.

According to the first preferred embodiment, the toaster housing 10 has a toaster slot 11 formed thereon for receiving the bread slice therein. The toaster case 10 should be made of metallic material, such as stainless steel, so that in the course of toasting the bread slices, the toaster case 10 is capable of withstanding high temperature without material structural deterioration.

The toasting device 20 is provided in the toaster housing 10 for toasting the bread slices in the toaster slots 11. The toasting device 20 is preferably embodied as a regular toasting device of a conventional toaster, such as comprising two side heaters thermally communicated with the toast racking arrangement 30 in such a manner that when the side heaters are actuated, they dries up two sides of the bread slice inside the toasting slot 11 so that the bread slice becomes brown and crisp. Each of the side heaters comprises a nichrome wire, having a predetermined resistance, electrically connected to a power source, such that when the power source is turned on, heat is generated along the nichrome wire to toast the bread slice in the toasting slot 11.

Figure 2:
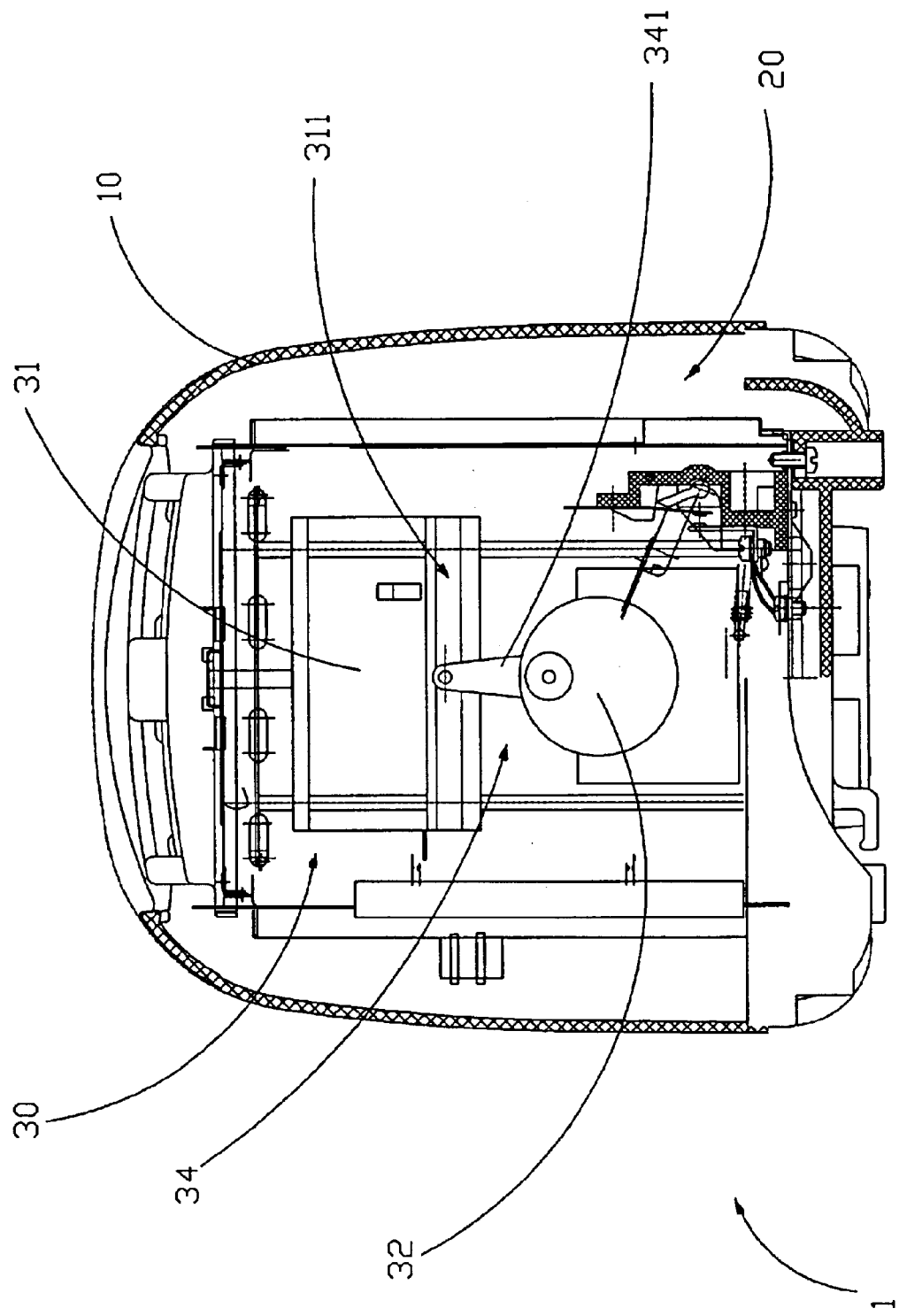
FIG. 2 is a front view of the toaster according to the above first preferred embodiment of the present invention.
Figure 3:
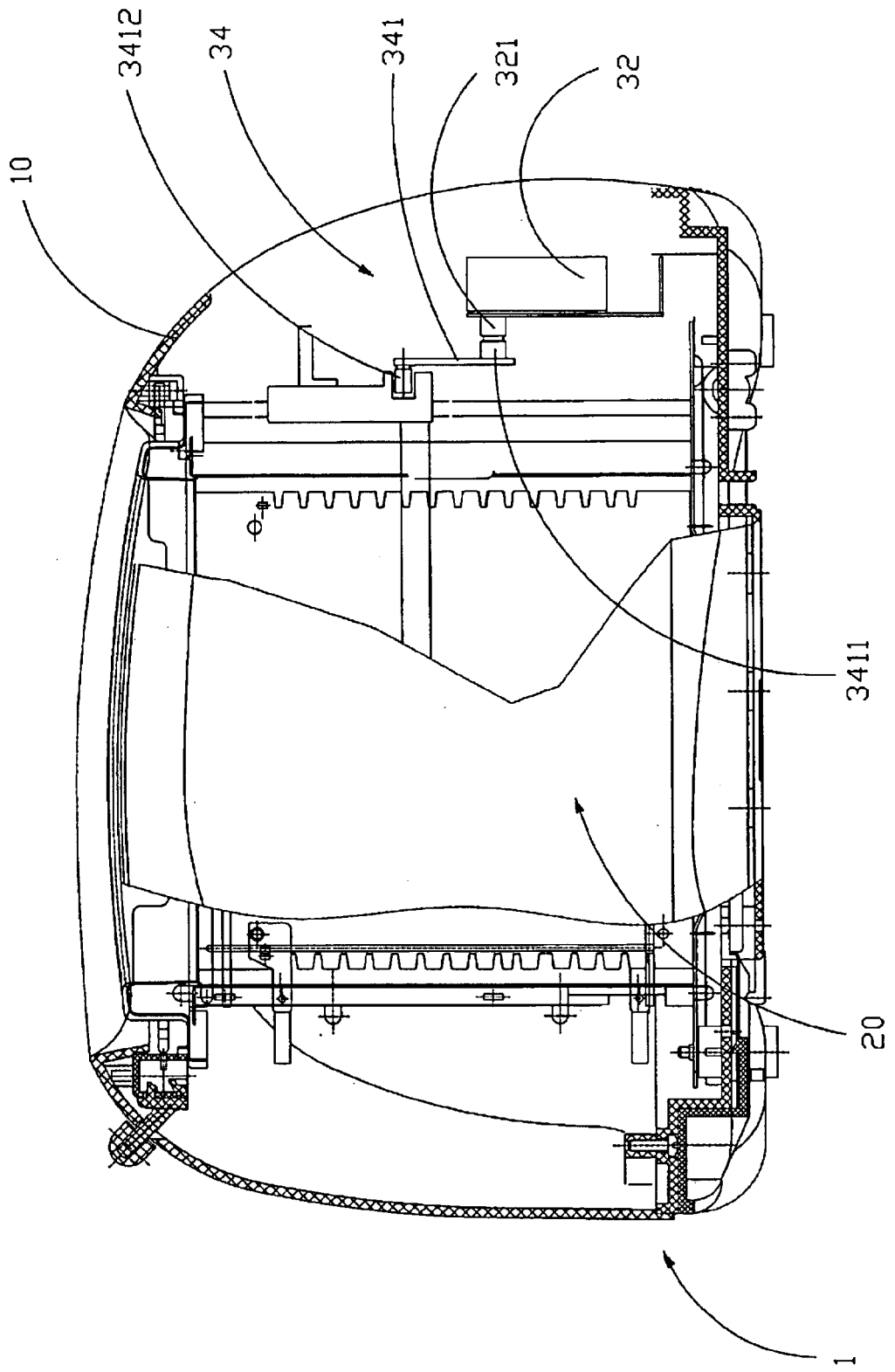
FIG. 3 is a side view of the toaster according to the above first preferred embodiment of the present invention.

Referring to FIG. 2 to FIG. 3 of the drawings, the toast racking arrangement 30 comprises a bread supporting rack 31 mounted in the toaster slot 11 in a vertically movable manner wherein the bread slice is arranged to support on the bread supporting rack 31 which is adapted for lifting up the bread slice and lowering the bread slice for toasting by the toasting device 20.

The toast racking arrangement 30 further comprises a motor 32 which is mounted at a bottom portion of the toaster housing 10 and has a driving shaft 321 rotatably extended thereof for producing a rotational force of predetermined magnitude. The motor 32 can be embodied as a servo motor or a synchronous motor whose rotational force can be controlled by electrical power inputted through a motor control circuit 33 implemented in the toaster housing 10.

Referring to FIG. 3, FIG. 4A and FIG. 4B of the drawings, the toast racking arrangement 30 further comprises a rack driving unit 34 comprising a driving member 341 having a motor driving end 3411 engaged with the driving shaft 321 of the motor 32, and a rack driving end 3412 movably coupled with the bread supporting rack 31 in such a manner that when the driving shaft 321 is driven to rotate, the driving members 341 drives the bread supporting rack 31 to slidably move along the toaster slot 11 between an upper releasing position and a lower toasting position. In which, at the upper releasing position, the driving member 341 is driven by the motor 32 to lift up the bread supporting rack 31 along the toaster slot 11, and at the lower toasting position, the driving member 341 is driven to lower the bread supporting rack 31 along the toaster slot 11 for toasting the bread slice supported thereon by the toasting device 20.

In other words, the motor driving end 3411 of the driving member 341 is driven to rotate by the driving shaft 321 to drive the rack driving end 3412 of the driving member 341 to move between the upper releasing position and the lower toasting position for converting the rotational force of the driving shaft 321 into a linear movement of said bread supporting rack 31. Accordingly, at the upper releasing portion, the driving member 341 is driven in such a manner that the rack driving end 3412 of the driving member 341 is positioned above the motor driving end 3411 thereof, and at the lower toasting position, the rack driving end 3412 of the driving member 341 is positioned below the motor driving end 3411 thereof.

According to the first preferred embodiment of the present invention, the bread supporting rack 31 has a coupling slot 311 longitudinally formed at a bottom portion of the bread supporting rack 31 wherein the rack driving end 3412 of the driving member 341 is movably engaged with the coupling slot 311 in such a manner that the rack driving end 3412 is adapted to reciprocally and slidably move along the coupling slot 311. In other words, the rack driving end 3412 is slidably engaged with the bread supporting rack 31 along the coupling slot 311.

Accordingly, the coupling slot 311 is longitudinally indented bottom portion of the bread supporting rack 31 and the rack driving end 3412 of the driving member 341 is protruded to slidably engage with the coupling slot 311 such that when the driving member 341 is driven to pivotally rotate by the driving shaft 321, the rack driving end 3412 of the driving member 341 is slid along the coupling slot 311 to drive the bread supporting rack 31 to slide along the toaster slot 11 in a vertically movable manner.

Figure 5:
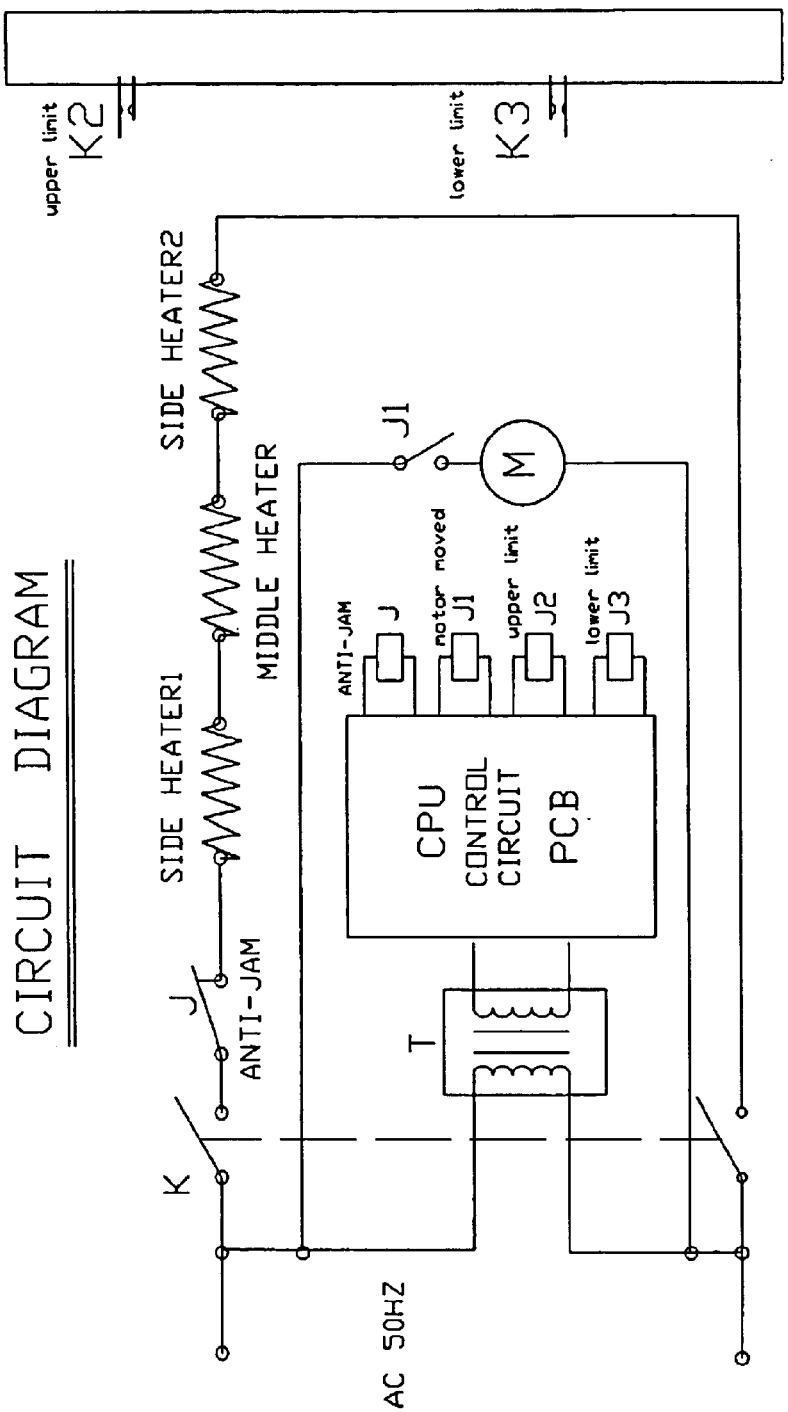
FIG. 5 is a schematic diagram of an electrical circuit of the toaster according to the above first preferred embodiment of the present invention.

Referring to FIG. 5 of the drawings, the motor control circuit 33 is electrically connected to the motor 32 and the side heaters of the toasting device 20 for controlling the operation of the toaster 1. The motor control circuit 33 works as follows: when the toaster 1 is connected to external power source which powers up the motor control circuit 33, the central processing unit of the motor control circuit 33 will first detect the position of the bread supporting rack 31. When the bread supporting rack 31 is positioned at the upper releasing position, the motor control circuit 33 is activated by the user to power up the motor 32 to drive the driving shaft 321 to rotate accordingly so as to lower the bread supporting rack 31 to its toasting position.

Referring to FIG. 4A and FIG. 4B of the drawings, when the driving shaft 321 is driven to rotate, it then drives the driving member 341 to rotate thereabout. In other words, the rack driving end 3412 is also driven to rotate about the driving shaft 321 of the motor 32. By simple mechanics, at each particular point, the velocity vector of a rotational motion can be broken down into a horizontal component and a vertical component, wherein the resultant of them constitute the rotational motion at that particular point. Hence, the rotational motion of the rack driving end 3412 of the driving member 341 actually composes of a horizontal motion, which leads to the sliding movement of the rack driving end 3412 along the coupling slot 311, and a vertical motion, which then drives the bread supporting rack 31 to slidably move downwardly into the lower toasting position.

When the bread supporting rack 31 reaches the lower toasting position, where the drive shaft 321 is arranged to have rotated 180 degrees, the motor control circuit 33 will cut off the power supplied to the motor 32 and, at the same time, powers up the two heating units of the toasting device 20 so as to start toasting the bread slice supported in the bread supporting rack 31. Furthermore, the central processing unit of the motor control circuit 33 is pre-loaded a timing algorithm which controls the timing of powering up the toasting device 20 in order to control the timing of toasting the bread slice, i.e. the toasting condition of the bread slice. When a predetermined period of time lapses, the toasting device is cut off its powers and, at the same time, the motor control circuit 33 re-powers up the motor 32 which then starts rotating again.

Since the driving shaft 321 has been rotated 180 degrees, representing that the rack driving end 3412 is in the toasting position with respect to the toaster case 10, any further rotation of the driving member 341, irrespective of the rotating direction, will then drive the rack driving end 3412 to rotate, wherein the rotation motion is constituted by a upward vertical component and a sideward horizontal component, as explained earlier. In other words, the rack driving end 3412 will then drive the bread supporting rack 31 moving upwardly along the coupling slot 311.

When the bread supporting rack 31 reaches the upper releasing position again, the motor control circuit 33 will cut off the power supplied to the motor 32 and the driving shaft 321 stops rotating. Eventually, the toasted bread slice on the bread supporting rack 31 is readily released.

It is worth to mention that by suitably setting the operational parameters, such as torque and rotational speed, of the motor 32 through the motor control circuit 33, the movement of the bread supporting rack 31 along the toaster slot 11 can be substantially controlled in a stable manner such that the bread slice supported on the bread supporting rack 31 will not be either over-ejected or under-ejected from the toaster slot 11.

According to the first preferred embodiment, the driving member 341 is embodied as having an elongated shape movably coupling between the driving shaft 321 and the bread supporting rack 31.

Figure 6B:
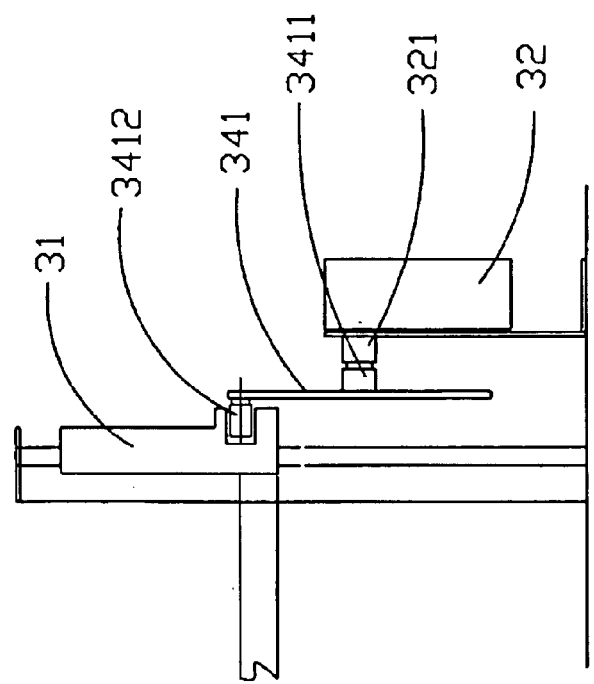
FIG. 6A and FIG. 6B are an alternative mode of the toaster according to the above first preferred embodiment of the present invention.
Figure 6A:
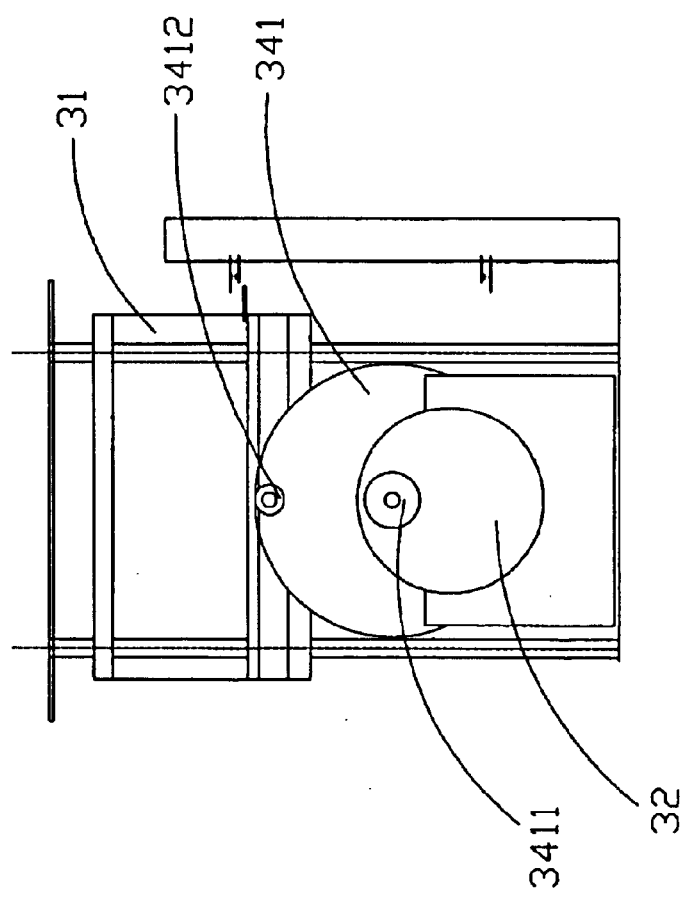

Referring to FIG. 6A and FIG. 6B of the drawings, as an alternative, the driving member 341B is embodied as having a circular shape wherein a rack driving portion 3412B is coupled with the coupling slot 311B in a slidably movable manner, and a motor driving portion 3411B is coupled with the driving shaft 321B of the motor 32B.

Referring to FIG. 7A and FIG. 7B of the drawings, a toaster 1' of a second embodiment illustrates an alternative mode of the first embodiment of the present invention. The toaster 1' according to the second embodiment has the same structure of the first embodiment except the toast racking arrangement 30'.

According to the second preferred embodiment, the toast racking arrangement 30' comprises a bread supporting rack 31', a motor 32', and a rack driving unit 34'. The bread supporting rack 31' is mounted in the toaster slot 11' in a vertically movable manner wherein the bread slice is arranged to rest on the bread supporting rack 31' which is adapted for lifting up the bread for releasing, and lowering the bread slice for toasting by the toasting device 20'. Moreover, the bread supporting rack 31' further has a biasing shoulder 312' longitudinally extended from a bottom portion of the bread supporting rack 31' for coupling with the rack driving unit 34'.

The motor 32' is mounted at a bottom portion of the toaster housing 10', and has a driving shaft 321' rotatably extended thereof for producing a rotational force of predetermined magnitude. The motor 32' can, as in the first preferred embodiment, be embodied as a servo motor or a synchronous motor whose rotational force can be controlled by electrical power inputted through a motor control circuit 33' implemented in the toaster housing 10'.

The rack driving unit 34' comprises a driving member 341' having a motor driving end 3411' engaged with the driving shaft 321' of the motor 32' and a rack driving end 3412' slidably engaged with a top surface of the biasing shoulder 312' in such a manner that it is capable of slidably moving along the biasing shoulder 312' on its top surface. In other words, the rack driving end 3412' of the driving member 341' is slidably held on the biasing shoulder 312' of the bread supporting rack 31'.

The driving member 341' further comprises a resilient element 343' disposed in the bottom portion of the toaster housing 10' and arranged to normally apply an urging force to the bread supporting rack 31' so as to push the bread supporting rack 31' up to the upper releasing position, so as to normally retain the bread supporting rack 31' at the releasing position.

The resilient element 343' is a compressive spring having two ends biasing against a bottom side of the bread supporting rack 31' and a bottom wall of the toaster housing 10' for providing a pushing force as the urging force against the bread supporting rack 31', so as to normally push the bread supporting rack 31' upwardly to the releasing position.

According to the second preferred embodiment, the operation of the toaster 1' is as follows: when the toaster 1' is connected to external power source which powers up the motor control circuit 33', the central processing unit of the motor control circuit 33' will first detect the position of the bread supporting rack 31'. When the bread supporting rack 31' is in the upper releasing position, the motor control circuit 33 will power up the motor 32' which drives the driving shaft 321' to rotate accordingly.

Referring to FIG. 7A and FIG. 7B of the drawings, when the driving shaft 321' is driven to rotate, it then drives the driving member 341' to rotate about the driving shaft 321'.

Hence, the rotational motion of the rack driving end 3412' of the driving member 341' comprises of a horizontal motion, which leads to the sliding movement of the rack driving end 3412' on top and alone the biasing shoulder 312', and a vertical motion, which then biases against the biasing shoulder 312' and drives the bread supporting rack 31' to slidably move downwardly into the lower toasting position alone the toaster slot 11'.

It is worth to mention that in the course of driving the bread supporting rack 31' moving downwardly, the resilient element 343' is compressed such that the bread supporting rack 31' is capable of reaching the lower toasting position.

When the bread supporting rack 31' reaches the lower toasting position, where the drive shaft 321' is arranged to have rotated 180 degrees, the motor control circuit 33' will cut off the power supplied to the motor 32' and, at the same time, powers up the two heating units of the toasting device 20' so as to start toasting the bread supported in the bread supporting rack 31'. Furthermore, the central processing unit of the motor control circuit 33' is pre-loaded a timing algorithm which controls the timing of powering up the toasting device 20' in order to control the timing of toasting the bread slice. When a predetermined period of time lapses, the toasting device is cut off its powers and, at the same time, the motor control circuit 33' re-powers up the motor 32' which then restarts rotating again.

Since the driving shaft 321' has already been rotated 180 degrees, the rack driving end 3412' is in the lowest position with respect to the toaster housing 10'. When the motor 32' restarts rotating, the compressed resilient element 343' rebounds and returns back to its original form to push the bread supporting rack 31' upwardly while the driving member 341' is driven to rotate about the driving shaft 321', and the rack driving end 3412' moves up vertically through the rotational motion thereof, thus relieving a biasing force applied to the biasing shoulder 312'.

Once the rack driving end 3412' moves up from the biasing shoulder 312', the resilient element 343' is then arranged to push the bread supporting rack 31' upwardly along the toaster slot 11' until the bread supporting rack 31' goes back to the upper releasing position.

When the bread supporting rack 31' reaches the upper releasing position again, the motor control circuit 33' will cut off the power supplied to the motor 32' and the driving shaft 321' stops rotating. Eventually, the toasted bread slice on the bread supporting rack 31' is readily released.

Figure 8B:
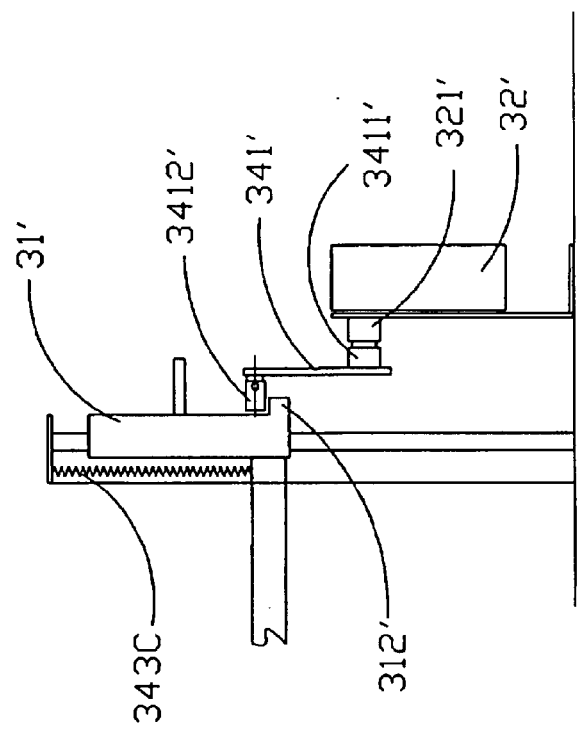
FIG. 8A and FIG. 8B are alternative mode of the toaster according to the above second preferred embodiment of the present invention.
Figure 8A:
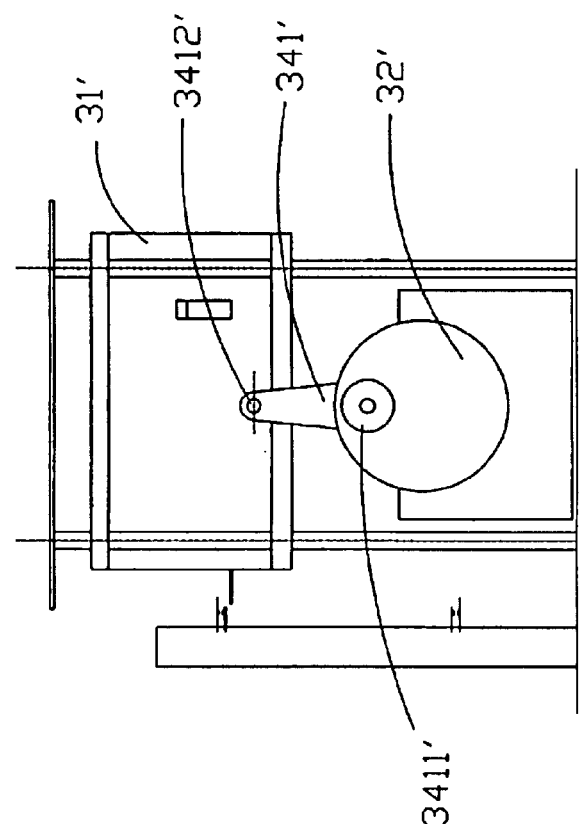

Referring to FIG. 8A and FIG. 8B of the drawings, an alternative mode of the toaster 1' according to the second preferred embodiment of the present invention is shown. According to the alternative mode, the resilient element 343C is a compressive spring having two ends biasing against a bottom side of said bread supporting rack 31' and a ceiling wall of the toaster housing 10' for providing a pulling force as the urging force against the bread supporting rack 31', so as to normally pull said bread supporting rack 31' upwardly to said releasing position.

When the bread supporting rack 31' reaches the lower toasting position, where the drive shaft 321' is arranged to have rotated 180 degrees, the motor control circuit 33' will cut off the power supplied to the motor 32' and, at the same time, powers up the two heating units of the toasting device 20' so as to start toasting the bread supported in the bread supporting rack 31'. Furthermore, the central processing unit of the motor control circuit 33' is pre-loaded a timing algorithm which controls the timing of powering up the toasting device 20' in order to control the timing of toasting the bread slice. When a predetermined period of time lapses, the toasting device is cut off its powers and, at the same time, the motor control circuit 33' re-powers up the motor 32' which then restarts rotating again.

It is worth pointing out that in the course of driving the bread supporting rack 31' moving downwardly, the resilient element 343C is stretched and extended such that the bread supporting rack 31' is capable of reaching the lower toasting position by being driven by the motor 32'.

Since the driving shaft 321' has already been rotated 180 degrees, the rack driving end 3412' is in the lowest position with respect to the toaster housing 10'. When the motor 32' restarts rotating, the driving member 341' is driven to rotate about the driving shaft 321', and the rack driving end 3412' moves up vertically through the rotational motion thereof, thus relieving a biasing force applied to the biasing shoulder 312'.

Once the rack driving end 3412' moves up from the biasing shoulder 312', the resilient element 343C is then arranged to pull the bread supporting rack 31' upwardly along the toaster slot 11' until the bread supporting rack 31' goes back to the upper releasing position.

Figure 9A:
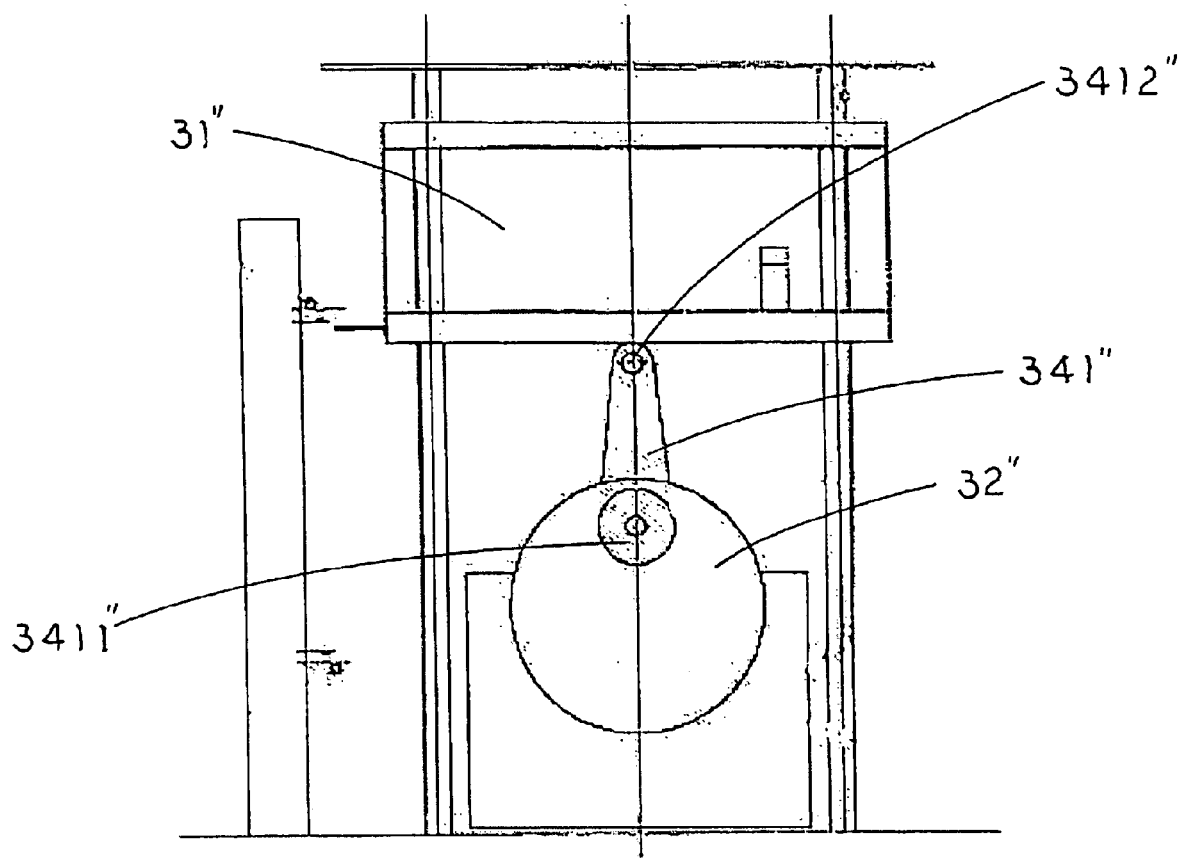
FIG. 9A and FIG. 9B are respectively sectional front view and sectional side view of the toaster according to a third preferred embodiment of the present invention.
Figure 9B:
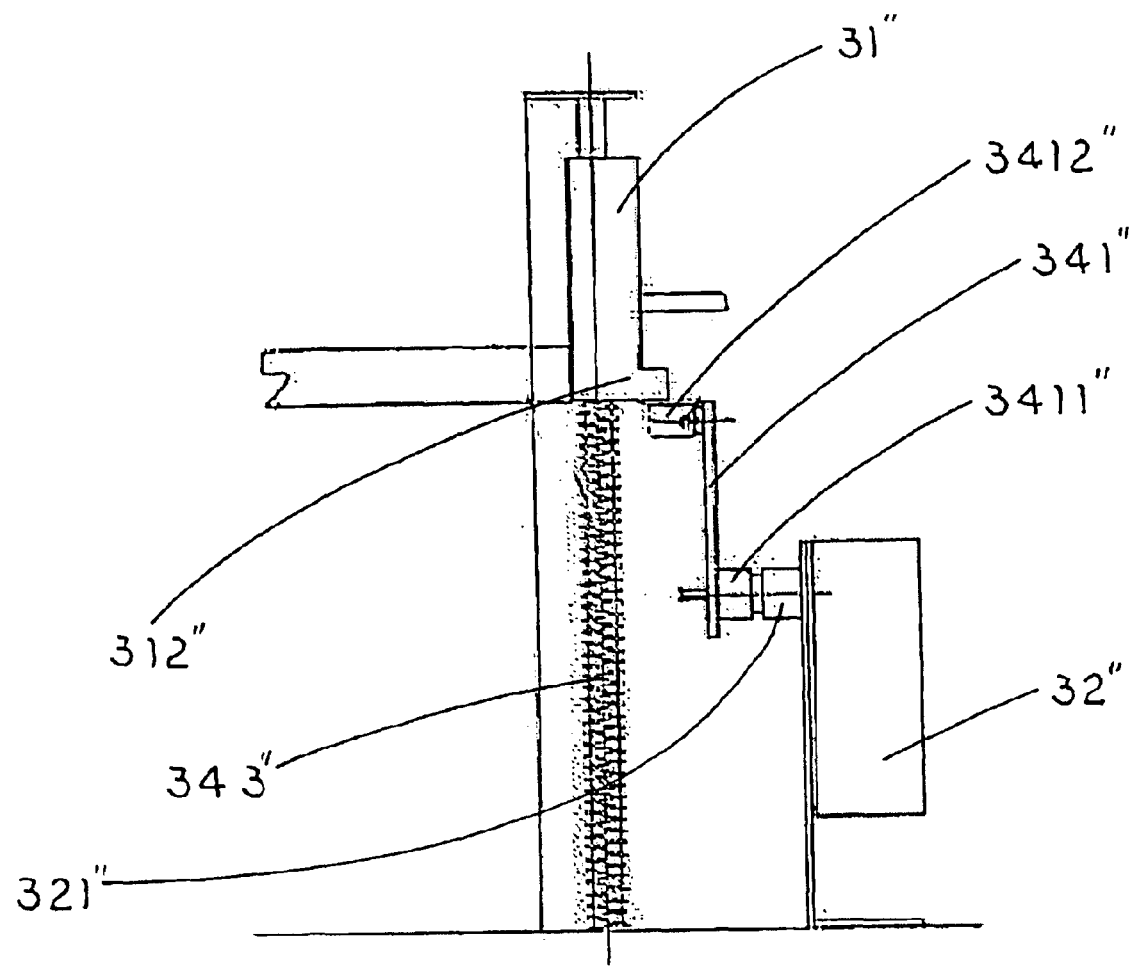

Referring to FIG. 9A and FIG. 9B of the drawings, a toaster 1" of a third preferred embodiment illustrates an alternative mode of the second embodiment of the present invention. The third preferred embodiment is similar to the second preferred embodiment except the toast racking arrangement 30".

According to the third preferred embodiment, the toast racking arrangement 30" comprises a bread supporting rack 31", a motor 32", and a rack driving unit 34". The bread supporting rack 31" is mounted in the toaster slot 11" in a vertically movable manner wherein the bread slice is arranged to rest on the bread supporting rack 31" which is adapted for lifting up the bread for releasing, and lowering the bread slice for toasting by the toasting device 20'. Moreover, the bread supporting rack 31" further has a biasing shoulder 312" longitudinally extended from a bottom portion of the bread supporting rack 31" for coupling with the rack driving unit 34".

The motor 32" is mounted at a bottom portion of the toaster housing 10", and has a driving shaft 321" rotatably extended thereof for producing a rotational force of predetermined magnitude. The motor 32" can, as in the second preferred embodiment, be embodied as a servo motor or a synchronous motor whose rotational force can be controlled by electrical power inputted through a motor control circuit 33" implemented in the toaster housing 10".

The rack driving unit 34" comprises a driving member 341" comprising having one motor driving end 3411" engaged with the driving shaft 321" of the motor 32" and a rack driving end 3412" slidably engaged with a bottom surface of the biasing shoulder 312" in such a manner that it is capable of slidably moving alone the biasing shoulder 312" while upwardly biasing against its bottom surface.

The driving member 341" further comprises a resilient element 343" disposed in the bottom portion of the toaster housing 10" and arranged to normally apply an downward pulling force to the bread supporting rack 31" so as to pull the bread supporting rack 31" down to the lower toasting position. Moreover, when the bread supporting rack 31" is in its upper releasing position, the resilient element 343" is extended, wherein a downward motion of the bread supporting rack 31" is substantially blocked by the rack driving end 3412" of the driving member 341".

Specifically, the resilient element 343" is a compressive spring having two ends biasing against a bottom side of the bread supporting rack 31" and a bottom wall of the toaster housing 10" for providing a pulling force as the urging force against the bread supporting rack 31", so as to normally pull said bread supporting rack 31" downwardly to said toasting position.

According to the third preferred embodiment, the operation of the toaster 1" is as follows: when the toaster 1" is connected to external power source which powers up the motor control circuit 33", the central processing unit of the motor control circuit 33" will first detect the position of the bread supporting rack 31". When the bread supporting rack 31" is in the upper releasing position, the motor control circuit 33" will power up the motor 32" which drives the driving shaft 321" to rotate accordingly.

Referring to FIG. 9A and FIG. 9B of the drawings, when the driving shaft 321" is driven to rotate, it then drives the driving member 341" to rotate about the driving shaft 321'. Hence, the rotational motion of the rack driving end 3412" of the driving member 341" composes of a horizontal motion, which leads to the sliding movement of the rack driving end 3412" alone the biasing shoulder 312", and a downward vertical motion, which relives the constraint of the downward motion of the bread supporting rack 31".

As a result, the resilient element 343" is then arranged to pull the bread supporting rack 31" downwardly to the lower toasting position. When the bread supporting rack 31" reaches the lower toasting position, where the drive shaft 321" is arranged to have rotated 180 degrees, the motor control circuit 33" will cut off the power supplied to the motor 32" and, at the same time, powers up the two heating units of the toasting device 20" so as to start toasting the bread supported in the bread supporting rack 31". Furthermore, the central processing unit of the motor control circuit 33" is pre-loaded a timing algorithm which controls the timing of powering up the toasting device 20" in order to control the timing of toasting the bread slice. When a predetermined period of time lapses, the toasting device is cut off its powers and, at the same time, the motor control circuit 33" re-powers up the motor 32" which then restarts rotating again.

Since the driving shaft 321" has already been rotated 180 degrees, the rack driving end 3412" is in the lowest position with respect to the toaster housing 10". When the motor 32" restarts rotating, the driving member 341" is driven to rotate about the driving shaft 321", and the rack driving end 3412" moves up vertically through the rotational motion thereof.

Since the rack driving end 3412" is biased against the bottom surface of the biasing shoulder 312", when rack driving end 3412" is driven to move upwardly by the motor 32", it drives the bread supporting rack 31" to move up as well into the upper releasing position and, at the same time, substantially extends the resilient element 343" to restore its normal downward pulling force applied to the bread supporting rack 31".

When the bread supporting rack 31" reaches the upper releasing position again, the motor control circuit 33" will cut off the power supplied to the motor 32" and the driving shaft 321" stops rotating. Eventually, the toasted bread slice on the bread supporting rack 31" is readily released.

Figure 10A:
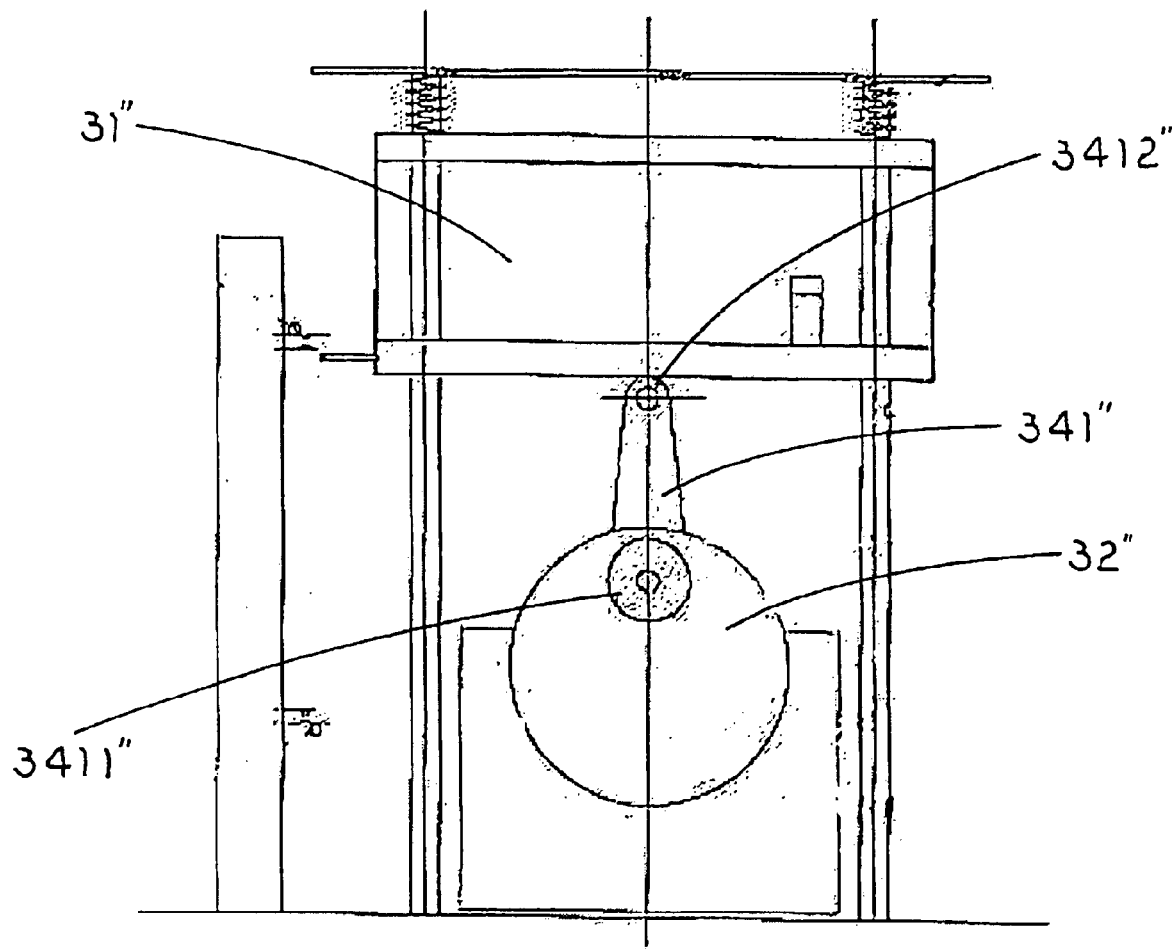
FIG. 10A and FIG. 10B are alternative mode of the toaster according to the above third preferred embodiment of the present invention.
Figure 10B:
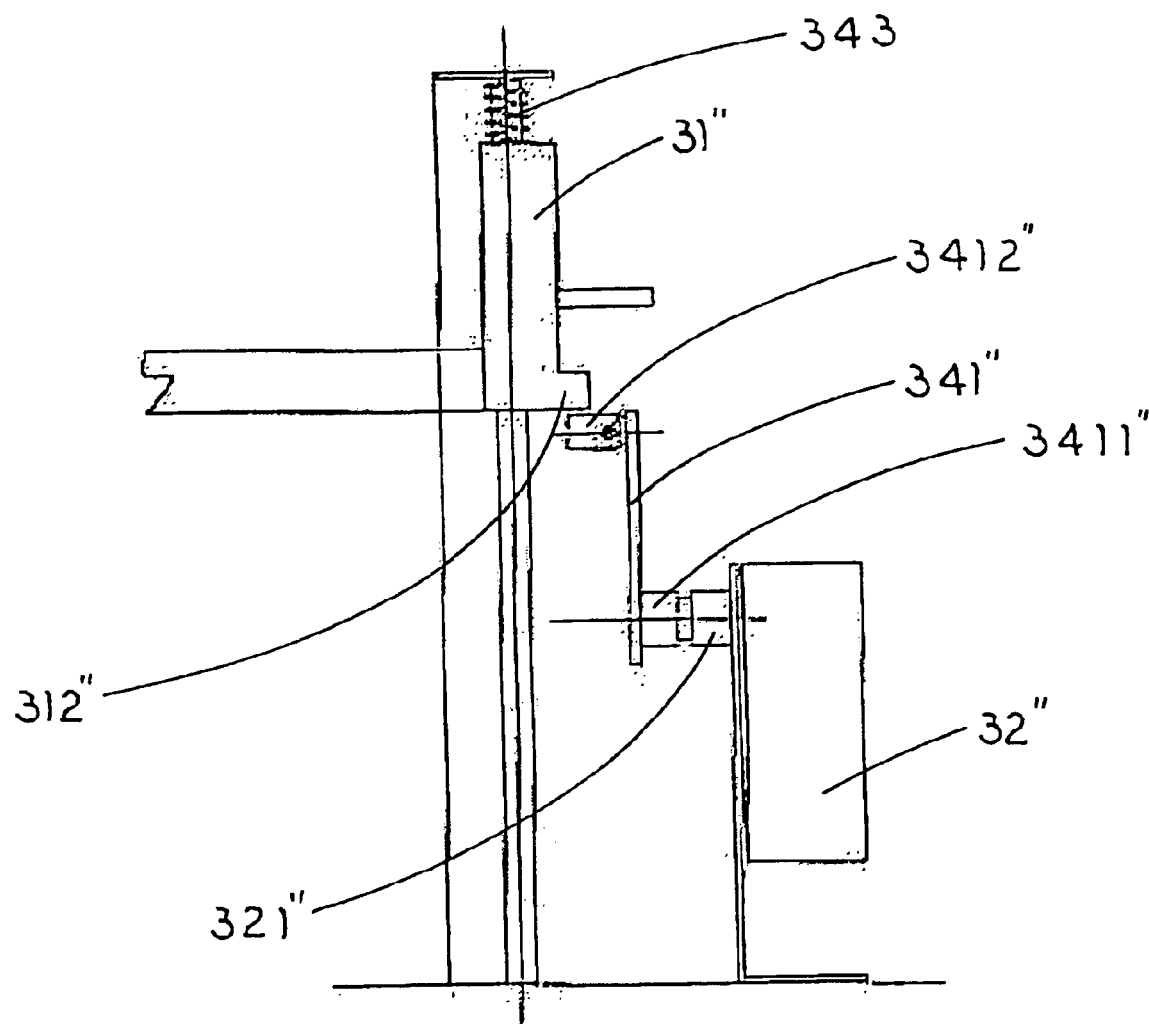

Referring to FIG. 10A and FIG. 10B of the drawings, an alternative mode of the toaster 1" according to the second preferred embodiment of the present invention is shown. According to the alternative mode, the resilient element 343D is mounted in an upper portion of the toaster housing 10" and arranged to normally apply a downward urging force to the bread supporting rack 31" so as to push the bread supporting rack 31" down to the lower toasting position.

Specifically, the resilient element 343D is a compressive spring having two ends biasing against the bottom side of said bread supporting rack 31" and a ceiling wall of said toaster housing 10" for providing a pushing force as the urging force against the bread supporting rack, so as to normally push the bread supporting rack 31" downwardly to the toasting position.

When the bread supporting rack 31" is in its upper releasing position, the resilient element 343D is compressed, wherein a downward motion of the bread supporting rack 31" is substantially blocked by the rack driving end 3412" of the driving member 341".

According to the third preferred embodiment, the operation of the toaster 1" is as follows: when the toaster 1" is connected to external power source which powers up the motor control circuit 33", the central processing unit of the motor control circuit 33" will first detect the position of the bread supporting rack 31". When the bread supporting rack 31" is in the upper releasing position, the motor control circuit 33" will power up the motor 32" which drives the driving shaft 321" to rotate accordingly.

Referring to FIG. 10A and FIG. 10B of the drawings, when the driving shaft 321" is driven to rotate, it then drives the driving member 341" to rotate about the driving shaft 321'. Hence, the rotational motion of the rack driving end 3412" of the driving member 341" composes of a horizontal motion, which leads to the sliding movement of the rack driving end 3412" alone the biasing shoulder 312", and a downward vertical motion, which relives the constraint of the downward motion of the bread supporting rack 31".

As a result, the resilient element 343D is then arranged to push the bread supporting rack 31" downwardly to the lower toasting position for toasting the bread slice on the bread supporting rack 31". After toasting, the motor 32" restarts rotating, the driving member 341" is driven to rotate about the driving shaft 321", and the rack driving end 3412" moves up vertically through the rotational motion thereof.

Since the rack driving end 3412" is biased against the bottom surface of the biasing shoulder 312", when rack driving end 3412" is driven to move upwardly by the motor 32", it drives the bread supporting rack 31" to move up as well into the upper releasing position and, at the same time, substantially compresses the resilient element 343D to restore its normal downward pushing force applied to the bread supporting rack 31".

Figure 11B:
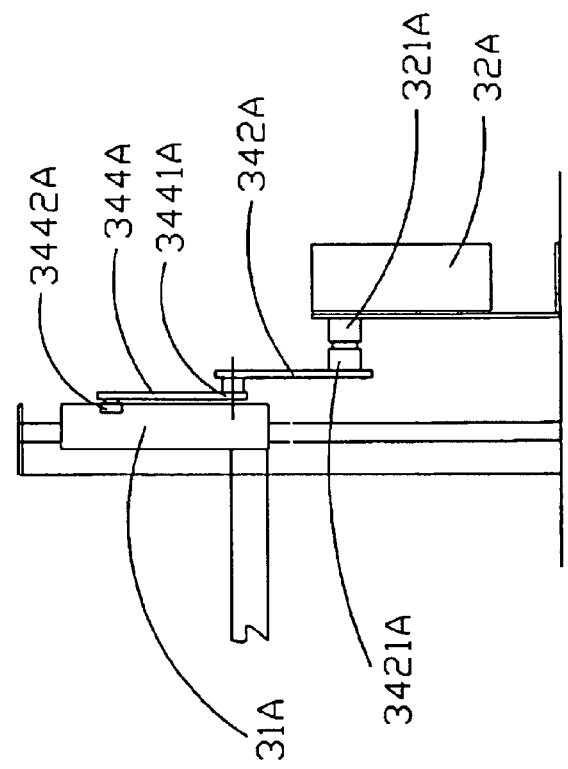
FIG. 11A and FIG. 11B are respectively sectional front view and sectional side view of the toaster according to a fourth preferred embodiment of the present invention.
Figure 11A:
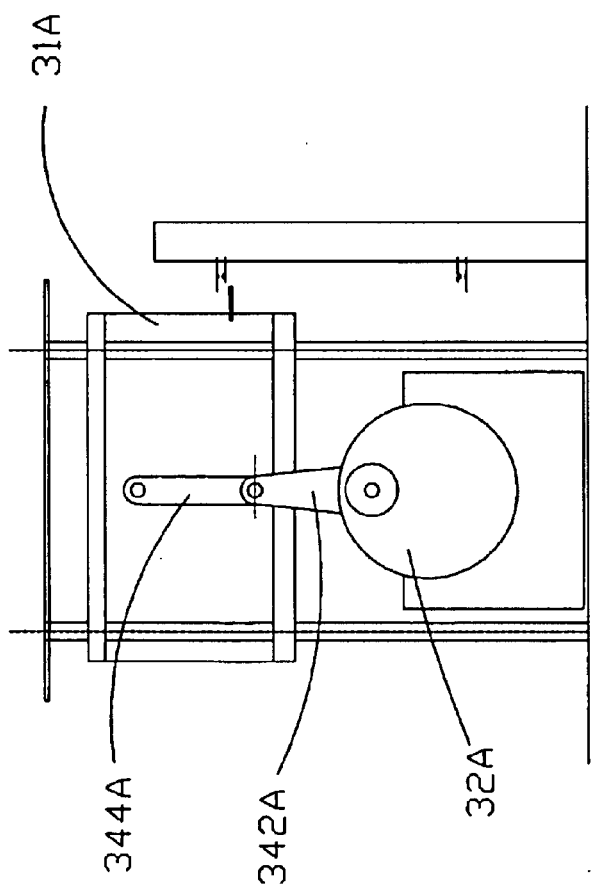

Referring to FIG. 11A and FIG. 11B of the drawings, a toaster 1A according to a fourth preferred embodiment of the present invention is illustrated. The fourth preferred embodiment is similar to the first preferred embodiment except the toast racking arrangement 30A.

According to the fourth preferred embodiment, the toast racking arrangement 30A comprises a bread supporting rack 31A, a motor 32A, and a rack driving unit 34A. The bread supporting rack 31A is mounted in the toaster slot 11A in a vertically movable manner wherein the bread slice is arranged to rest on the bread supporting rack 31A which is adapted for lifting up the bread for releasing, and lowering the bread slice for toasting by the toasting device 20A.

The motor 32A is mounted at a bottom portion of the toaster housing 10A, and has a driving shaft 321A rotatably extended thereof for producing a rotational force of predetermined magnitude. The motor 32A can, as in the first preferred embodiment, be embodied as a servo motor or a synchronous motor whose rotational force can be controlled by electrical power inputted through a motor control circuit 33A implemented in the toaster housing 10A.

The driving member 341A comprises a motor driving element 342A and a motor driven element 344A pivotally connected to the motor driving element 342A in an end-to-end manner, wherein the motor driving end 3421A is defined at the motor driving element 342A to engage with the driving shaft 321A and the rack driving end 3442A is defined at the motor driven element 344A to rotatably coupled with the bread supporting rack 31A, in such a manner that at the toasting position, the motor driving element 342A is pivotally overlapped with the motor driven element 344A to reduce a distance between the motor driving end 3421A and the rack driving end 3442A so as to pull the bread supporting rack 31A downwardly, and at the releasing position, the motor driving element 342A is pivotally extended from the motor driven element 344A to extend a distance between the motor driving end 3421A and the rack driving end 3442A so as to push the bread supporting rack 31A upwardly.

According to the fourth preferred embodiment, the operation of the toaster 1A is as follows: when the toaster 1A is connected to external power source which powers up the motor control circuit 33A, the central processing unit of the motor control circuit 33A will first detect the position of the bread supporting rack 31A. When the bread supporting rack 31A is in the upper releasing position, the motor control circuit 33A will power up the motor 32A which drives the driving shaft 321A to rotate accordingly.

Referring to FIG. 11A and FIG. 11B of the drawings, when the driving shaft 321A is driven to rotate, it then drives the motor driving element 342A to rotate about the driving shaft 321A. Since the motor driving element 342A is pivotally connected to the motor driven element 344A, it is then driven to rotate. The rotational motion constitutes a downward vertical motion thereof which drives the bread supporting rack 31A to move downwardly along the toaster slot 11A.

When the bread supporting rack 31A reaches the lower toasting position, where the drive shaft 321A is arranged to have rotated 180 degrees, the motor control circuit 33A will cut off the power supplied to the motor 32A and, at the same time, powers up the two heating units of the toasting device 20A so as to start toasting the bread supported in the bread supporting rack 31A. When the toasting is finished, the motor 32A starts re-rotating.

Since the driving shaft 321A has already been rotated 180 degrees, the rack driving end 3442A is in the lowest position with respect to the toaster housing 10'. When the motor 32' restarts rotating, the motor driving element 342A is driven to rotate about the driving shaft 321A, and the rack driving end 3442A of the motor driven element 344A moves upwardly which then drives the bread supporting rack 31A moving upwardly along the toaster slot 11A back to the upper releasing position.

From the foregoing analysis, one can see that the objects of the present invention are substantially fulfilled. It is worth mentioning that the present invention does not involve any expensive elements so as to minimize its manufacturing cost and the ultimate selling price.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A toaster for toasting a bread slice, comprising:
   a toaster housing having a toaster slot for said bread slice disposing therein;
   a toasting device provided in said toaster housing for toasting said bread slice in said toaster slot; and
   a toast racking arrangement, comprising:
      a bread supporting rack movably mounted in said toaster slot for supporting said bread slice;
      a motor having a driving shaft rotatably extended thereof for producing a rotational force; and
      a rack driving unit comprising a driving member having a motor driving end engaged with said driving shaft of said motor and a rack driving end movably coupled with said bread supporting rack in such a manner that when said driving shaft is driven to rotate, said driving member drives said bread supporting rack to slidably move along said toaster slot between an upper releasing position and a lower toasting position, wherein at said releasing position, said driving member is driven by said motor to lift up said bread supporting rack along said toaster slot, and at said toasting position, said driving member is driven to lower said bread supporting rack for toasting said bread slice by said toasting device within said toaster slot.

2. The toaster, as recited in claim 1, wherein said motor driving end of said driving member is driven to rotate by said driving shaft to drive said rack driving end of said driving member to move between said releasing position and said toasting position for converting said rotational force of said driving shaft into a linear movement of said bread supporting rack, wherein at said releasing position, said driving member is driven that said rack driving end of said driving member is positioned above said motor driving end thereof, and at said toasting position, said rack driving end of said driving member is positioned below said motor driving end thereof.

3. The toaster, as recited in claim 1, wherein said bread supporting rack has a coupling slot longitudinally extended at a bottom portion of said bread supporting rack, wherein said rack driving end is reciprocally engaged with said coupling slot in a slidably movable manner such that when said motor driving end of said driving member is driven to rotate, said rack driving end of said driving member is slid along said coupling slot to push said bread supporting rack downwardly to said toasting position and to pull said bread supporting rack upwardly to said releasing position.

4. The toaster, as recited in claim 2, wherein said bread supporting rack has a coupling slot longitudinally extended at a bottom portion of said bread supporting rack, wherein said rack driving end is reciprocally engaged with said coupling slot in a slidably movable manner such that when said motor driving end of said driving member is driven to rotate, said rack driving end of said driving member is slid along said coupling slot to push said bread supporting rack downwardly to said toasting position and to pull said bread supporting rack upwardly to said releasing position.

5. The toaster, as recited in claim 1, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

6. The toaster, as recited in claim 2, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

7. The toaster, as recited in claim 4, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

8. The toaster, as recited in claim 2, wherein said toast racking arrangement further comprises a resilient element disposed within said toaster slot for applying an urging force against said bread supporting rack to lift up said bread supporting rack, so as to normally retain said bread supporting rack at said releasing position.

9. The toaster, as recited in claim 8, wherein said bread supporting rack has a biasing shoulder outwardly extended from a bottom side of said bread supporting rack, wherein said rack driving end of said driving member is slidably held on said biasing shoulder of said bread supporting rack such that when said motor driving end of said driving member is driven to rotate, said rack driving end of said driving member pulls said bread supporting rack downwardly to said toasting position.

10. The toaster, as recited in claim 9, wherein said resilient element is a compressive spring has two ends biasing against said bottom side of said bread supporting rack and a bottom wall of said toaster housing for providing a pushing force as said urging force against said bread supporting rack, so as to normally push said bread supporting rack upwardly to said releasing position.

11. The toaster, as recited in claim 9, wherein said resilient element is a compressive spring has two ends biasing against said bottom side of said bread supporting rack and a ceiling wall of said toaster housing for providing a pulling force as said urging force against said bread supporting rack, so as to normally pull said bread supporting rack upwardly to said releasing position.

12. The toaster, as recited in claim 10, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

13. The toaster, as recited in claim 11, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

14. The toaster, as recited in claim 2, wherein said toast racking arrangement further comprises a resilient element disposed within said toaster slot for applying an urging force against said bread supporting rack to lower said bread supporting rack, so as to normally retain said bread supporting rack at said toasting position.

15. The toaster, as recited in claim 14, wherein said bread supporting rack has a biasing shoulder outwardly extended from a bottom side of said bread supporting rack, wherein said rack driving end of said driving member is slidably biased against said bottom side of said biasing shoulder of said bread supporting rack such that when said motor driving end of said driving member is driven to rotate, said rack driving end of said driving member pushes said bread supporting rack upwardly to said releasing position.

16. The toaster, as recited in claim 15, wherein said resilient element is a compressive spring has two ends biasing against said bottom side of said bread supporting rack and a bottom wall of said toaster housing for providing a pulling force as said urging force against said bread supporting rack, so as to normally pull said bread supporting rack downwardly to said toasting position.

17. The toaster, as recited in claim 15, wherein said resilient element is a compressive spring has two ends biasing against said bottom side of said bread supporting rack and a ceiling wall of said toaster housing for providing a pushing force as said urging force against said bread supporting rack, so as to normally push said bread supporting rack downwardly to said toasting position.

18. The toaster, as recited in claim 16, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

19. The toaster, as recited in claim 17, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

20. The toaster, as recited in claim 1, wherein said driving member comprises a motor driving element and a motor driven element pivotally connected to said motor driving element in an end-to-end manner, wherein said motor driving end is defined at said motor driving element to engage with said driving shaft and said rack driving end is defined at said motor driven element to pivotally couple with said bread supporting rack, in such a manner that at said toasting position, said driven motor driving element is pivotally overlapped with said motor driven element to reduce a distance between said motor driving end and said rack driving end so as to pull said bread supporting rack downwardly, and at said releasing position, said driven motor driving element is pivotally extended from said motor driven element to extend a distance between said motor driving end and said rack driving end so as to push said bread supporting rack upwardly.

21. The toaster, as recited in claim 2, wherein said driving member comprises a motor driving element and a motor driven element pivotally connected to said motor driving element in an end-to-end manner, wherein said motor driving end is defined at said motor driving element to engage with said driving shaft and said rack driving end is defined at said motor driven element to pivotally couple with said bread supporting rack, in such a manner that at said toasting position, said driven motor driving element is pivotally overlapped with said motor driven element to reduce a distance between said motor driving end and said rack driving end so as to pull said bread supporting rack downwardly, and at said releasing position, said driven motor driving element is pivotally extended from said motor driven element to extend a distance between said motor driving end and said rack driving end so as to push said bread supporting rack upwardly.

22. The toaster, as recited in claim 20, wherein said toast racking arrangement further comprises a motor control circuit electrically connected said motor with said toasting device for controlling an operation of said toaster device in such a manner that when said bread supporting rack is driven to said toasting position, said motor control circuit automatically activates said toasting device for toasting said bread slice, and when said bread supporting rack is driven to said releasing position, said motor control circuit automatically deactivates said toasting device.

23. The toaster, as recited in claim 21, wherein said toast racking arrangement further comprises a motor control circuit electrically connected said motor with said toasting device for controlling an operation of said toaster device in such a mariner that when said bread supporting rack is driven to said toasting position, said motor control circuit automatically activates said toasting device for toasting said bread slice, and when said bread supporting rack is driven to said releasing position, said motor control circuit automatically deactivates said toasting device.

* * * * *